C. R. STANDLEY.
LUGGAGE CARRIER FOR AUTOMOBILES.
APPLICATION FILED MAR. 22, 1919.

1,395,457.

Patented Nov. 1, 1921.
2 SHEETS—SHEET 1.

Witnesses
Geo. Knutson
E. C. Wells

Inventor
C. R. Standley
By his Attorneys
Williamson & Merchant

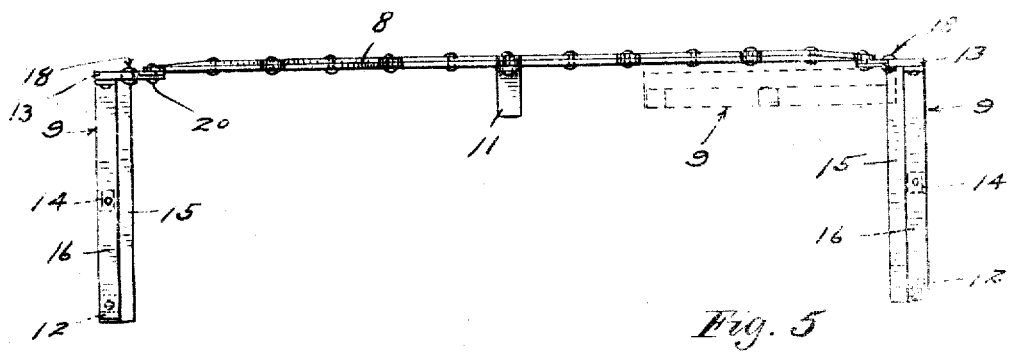

UNITED STATES PATENT OFFICE.

CLEO R. STANDLEY, OF BOONE, IOWA.

LUGGAGE-CARRIER FOR AUTOMOBILES.

1,395,457.  Specification of Letters Patent.  Patented Nov. 1, 1921.

Application filed March 22, 1919. Serial No. 284,379.

*To all whom it may concern:*

Be it known that I, CLEO R. STANDLEY, a citizen of the United States, residing at Boone, in the county of Boone and State of Iowa, have invented certain new and useful Improvements in Luggage-Carriers for Automobiles; and I do hereby declare the following to be a full, clear, and exact description of the invention, such as will enable others skilled in the art to which it appertains to make and use the same.

My invention consists in certain new and useful structural improvements in luggage carriers for automobile running boards, of the class in which there is employed a lazy tongs lever for the outer member, with means for securing it at its ends to the running board of an automobile.

The object of my invention is to provide a device of this kind of simple, durable and inexpensive construction, that may be readily, quickly and easily applied to or removed from a running board, or folded up in small and compact space, in a convenient and facile manner without the use of tools.

My invention consists in certain details in the construction, arrangement and combination of the several parts of the device, whereby the objects contemplated are attained, as hereinafter more fully set forth, pointed out in my claims, and illustrated in the accompanying drawings, in which:

Fig. 3 is a plan view of the luggage carrier, as shown in Fig. 2, with the exception that one of the end members is shown in a folded position by means of broken lines.

Fig. 4 is a view in inside elevation, showing the luggage carrier folded; and

Fig. 5 is a detail perspective view of one of the upper hinge connections.

Figure 1:
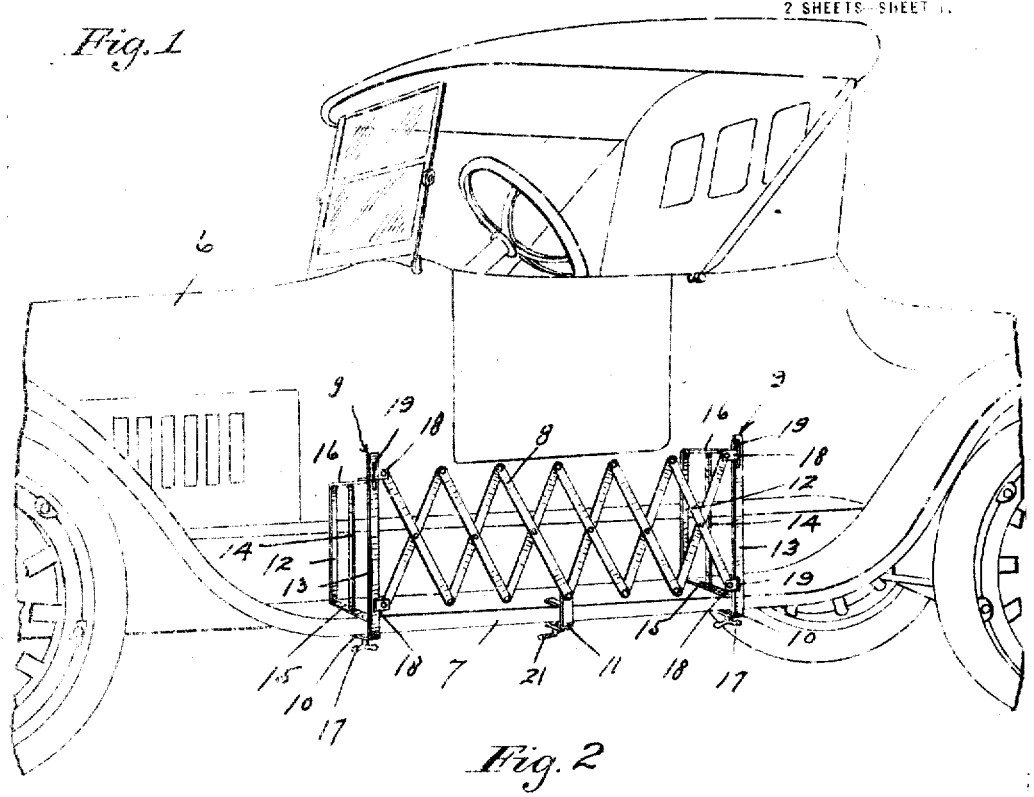
Figure 1 is a fragmentary perspective view of an automobile having the improved luggage carrier secured to the running board thereof.

In the accompanying drawings I have used the reference numeral 6 to indicate generally an automobile, and 7 the running board thereof.

My improved luggage carrier comprises an outer luggage retaining member formed of flat bars pivoted together in the form of a lazy tongs 8. At each of the projecting end bars of this lazy tongs I have provided a metal loop 18, pivotally connected to the lazy tongs bars by rivets 20.

The two end members for forming the end portions of the luggage carrier, are each indicated generally by the numeral 9, and each comprises in its construction an upright supporting member 13. This supporting member is formed of a piece of flat metal with its lower end bent inwardly at 10 to go under a running board, and it is provided at its inner end with a hand screw 17.

Figure 2:
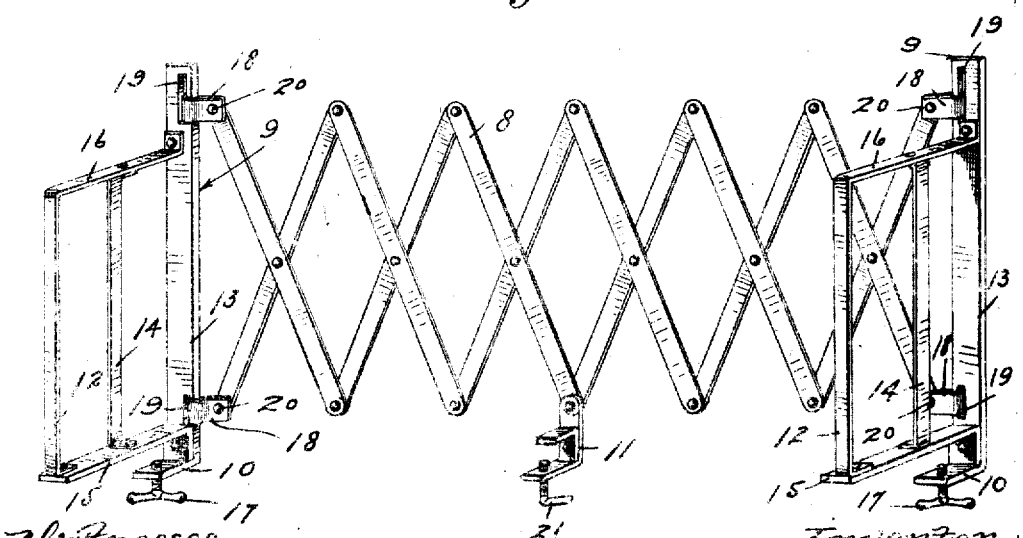
Fig. 2 is a perspective view of the luggage carrier removed from the automobile and looking at the same from the inside.

Adjacent to the inner side of each of the flat supporting members 9 I have formed two slots 19, one near the bottom and the other near the top. These slots are so spaced from the inner edge of each of the uprights that the material between the slot and the inner edge is substantially square in cross section, and the loops 18 are passed through these slots and surround said square upright members, so that the said loops 18 may freely turn in a pivotal manner relative to the said uprights 13. In addition to this, the upper slot 19 is made substantially longer than the lower one, and by this arrangement the following advantageous result is attained:

The lower set of loops 18 have substantially no vertical movement in their slots, while the upper ones, on account of the difference in the length of the slots, are capable of a substantial amount of upward and downward movement. When the lazy tongs is fully extended, as shown in Figs. 2 and 5, the loops 18 will rest against the material at the bottom of the upper slots 19, and when the lazy tongs is completely collapsed, as shown in Fig. 4, the said loops 18 at the top will be at the top of the slots 19. Hence when the lazy tongs lever is completely extended, as in use, the loops 18 of the lazy tongs will rest upon the bottom of the upper slots 19, and will thereby be held in position just as efficiently as though they were actually clamped in said position, and yet when it becomes desirable to collapse the luggage carrier, this may be done without the adjustment of any set screws or other manipulations.

At the inner face of each of the upright supporting members 13 is a rigid frame comprising metal bars 12, 14, 15 and 16, which are rigidly secured by rivets to the said uprights 13. The parts 15 of these end members rest flat on top of the automobile running board, and form part of the clamp by which the device is secured to the running board. The other members 12, 14 and 16 of the end members serve as braces to normally hold the parts 15 in their position at right angles to the uprights 13, so that when the parts 15 are resting upon and clamped to a running board, the uprights 13 will be thereby firmly braced against outward movement at their upper edge. At the central portion of the lazy tongs is a clamp device 11, provided with a hand screw 21 designed for clamping to a running board to thereby brace the central portion of the lazy tongs at this point.

In practical use it is obvious that the device may be folded up in a small space and compact manner, as shown in Fig. 4.

In order to apply the device to an automobile, it is only necessary to unfold the two end members to positions at right angles to the lazy tongs, then stretch the lazy tongs to their outer limit of movement, then apply the device to a running board and manually adjust the three hand screws 17 and 21. All of this may be done in a speedy, convenient and facile manner, without the use of any tools.

When this has been accomplished a luggage carrier is provided of very strong, rigid and durable construction, without any parts likely to become lost or out of adjustment. The lazy tongs is firmly and securely held against movement in any direction, and especially against any liability of rattling, because of the limitation of the movement of the loops 18 in the slots 19, because they are held against the lower edges of the upper slots and against the upper edges of the lower slots by the lazy tongs levers.

However, when it is desired to remove the device from a running board it is only necessary to release the three hand screws at the bottom, whereupon the lazy tongs may be collapsed and the end members folded inwardly, without the use of any tools or the adjustment of any set screws or the like.

I am aware that heretofore luggage carriers have been provided in which a lazy tongs member and pivoted end members attached thereto, have been employed. I do not desire to be understood as claiming broadly this invention.

What I claim is:

A luggage carrier for automobiles, comprising a member composed of bars pivoted together to form lazy tongs metal loops pivotally connected to the four projecting end members of the lazy tongs, end frames each comprising a flat metal upright support, means for clamping the support adjacent the outer edge of the running board, said support being provided with two slots one adjacent each end, said loops being adapted to pass through said slots, providing a hinged connection between the lazy tongs and end members, said upper slots being of sufficient length to permit folding of the lazy tongs, each end frame provided with a member secured to the upright and designed to lie upon the top of the running board, and a brace rigidly secured to the part that extends over the running board and also to the upright.

In testimony whereof I affix my signature.

CLEO R. STANDLEY.